Nov. 30, 1937.  C. A. THOMAS  2,100,823
METHOD AND APPARATUS FOR PERFORMING PYROGENETIC REACTIONS
Filed May 6, 1935
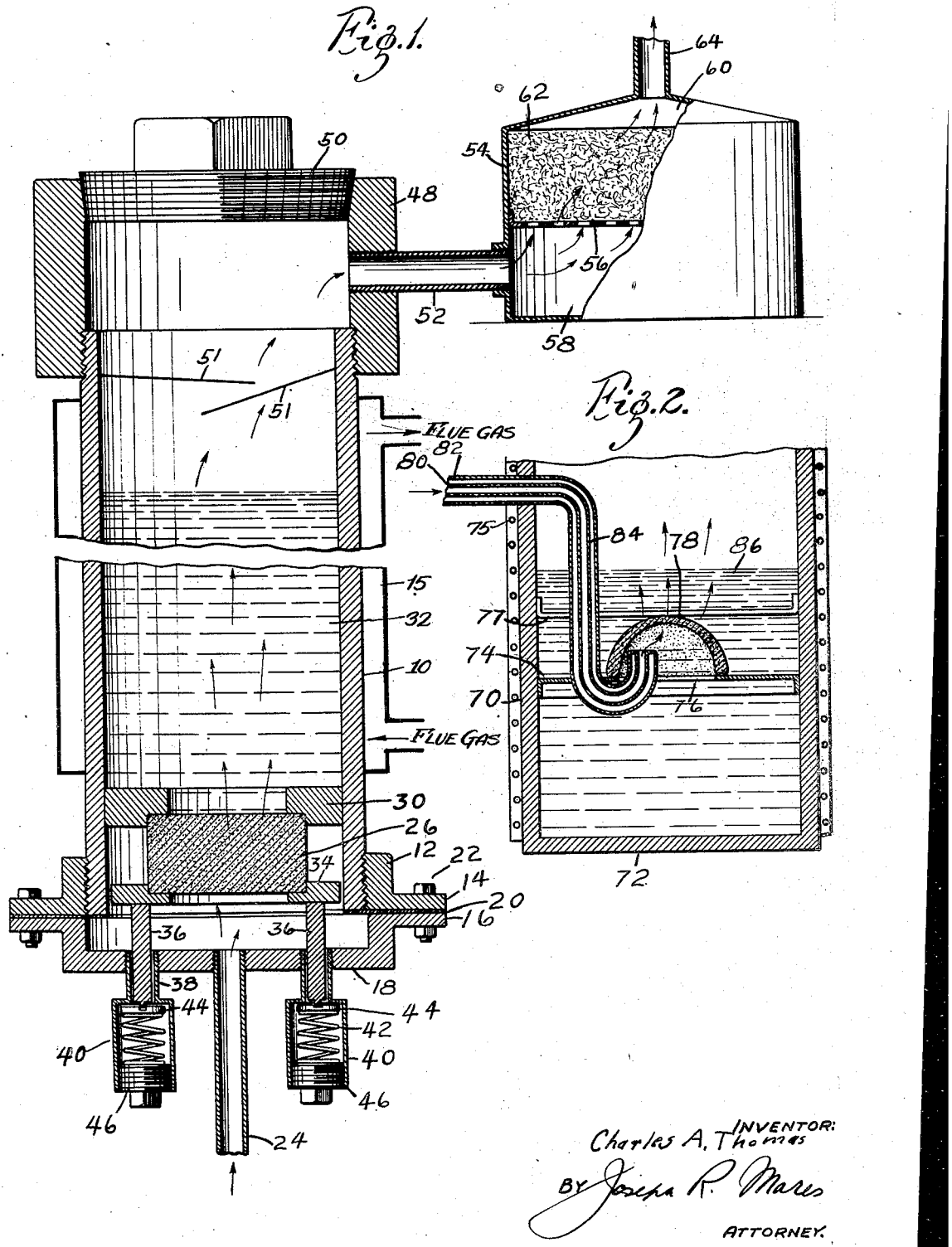
INVENTOR:
Charles A. Thomas
BY Joseph R. Mares
ATTORNEY.

Patented Nov. 30, 1937

2,100,823

UNITED STATES PATENT OFFICE 2,100,823

METHOD AND APPARATUS FOR PERFORMING PYROGENETIC REACTIONS

Charles A. Thomas, Dayton, Ohio, assignor, by mesne assignments, to Monsanto Chemical Company, a corporation of Delaware Application May 6, 1935, Serial No. 19,980

13 Claims. (Cl. 196—70)

The present invention relates to the treatment of organic materials at elevated temperatures and it has particular relation to methods of and apparatus for conducting such treatment in which the organic material is brought into direct contact with a relatively non-volatile and permanent liquid heat transfer medium at the operating temperature.

The main objects of the invention are to provide:

A process of and apparatus for effecting heat treatment of organic materials by direct contact with a molten heat transfer material in which premature cracking of the material and clogging of the conduits and openings for the admission of the organic material into the heat transfer bath are materially reduced or inhibited;

A process of pyrogenetically treating organic material in which exceptionally thorough dissemination of the material through, and rapid and complete transfer of heat from the heating medium are effected;

A process as above indicated in which the decomposition of the organic material into tarry substances and other undesirable by-products is reduced to a minimum;

A process of high temperature hydrocarbon pyrolysis that is predominately one of dehydrogenation and of simple cracking in the sense that a hydrocarbon molecule is split into two or more hydrocarbon molecules having in the aggregate the same number of carbon atoms, while avoiding secondary reaction by which the pyrolysis products are polymerized or condensed to form liquid condensates containing aromatics and probably produced by polymerization of normally gaseous unsaturated hydrocarbons formed by the simple cracking and dehydrogenation.

An apparatus for conducting the above indicated operations having structural features which adapt it for the above purposes.

These and other objects will be apparent from consideration of the appended specification and the accompanying drawing.

In the drawing Figure 1 is a view, partially in cross-section and partially in elevation, of an embodiment of apparatus suitable for practicing the invention. Figure 2 is a fragmentary, cross-sectional view of a modified form of the apparatus also embodying the invention.

In such pyrogenetic reactions as the cracking or splitting of high molecular weight hydrocarbons to form simpler compounds, the polymerization of compounds of low molecular weight to form materials of high molecular weight, the rearrangement of isomeric compounds and similar reactions, it has heretofore been proposed to effect necessary heat transfer to the material undergoing treatment by bubbling the material from conduits through, or otherwise effecting relatively intimate contact between the material and a molten, non-volatile heat transfer medium such as lead, mercury, glass and non-volatile salts whose points of fusion are at or below the temperature at which it is desired to conduct the reactions.

Examples of patents disclosing such processes are United States Patents 1,418,385, 1,092,366 and 179,005. Although such processes offered certain advantages over prior processes of conducting these reactions by passing the materials through heated tubes, certain difficulties were encountered in the application thereof. For example, the tubes employed to conduct the material into the molten bath became highly heated, thereby resulting in premature cracking and causing the deposition of carbon and tarry products in the inlet tubes and the outlets thereof. This accumulation of solid material, of course, soon resulted in clogging of the tubes and necessitated shutting down of the apparatus for cleaning them. In event the material was discharged as a relatively large stream from a single nozzle or a comparatively few relatively large nozzles, the bubbles or bodies of gaseous material or other material undergoing treatment were relatively large and since heat transfer through these was comparatively slow, there was a strong tendency to produce overheating in the outer layers of materials and thus to produce excessive carbon and tar formation while at the same time the interiors of the masses were not heated to effective reaction temperature, at least within a reasonable period of exposure. Attempts to overcome these defects by providing distributor heads with a relatively large number of small openings for discharging the material into the molten baths were unsuccessful because the finer the openings in the distributor head the more quickly they became clogged with carbon due to premature cracking. It was also found impractical in actual practice to provide an adequate number of sufficient small openings to obtain efficient breaking up of the material undergoing treatment into sufficiently small bubbles or globules.

The present invention is based upon the discovery that gaseous and vaporized liquid aliphatic hydrocarbons may be discharged directly through plates or other bodies of non-perforate but porous refractory materials into a molten bath of a non-reactive, non-volatile substance without any material tendency for the substances constituting the molten bath to permeate the porous material. Furthermore, contrary to what reasonably could have been predicted from knowledge of the relatively minute pores and passages through the body, if precautions are observed to prevent excessive preheating of the gases in the inlet conduits, there is but little tendency for the material undergoing treatment to decompose and form carbon and tar therein. As a result of passing through a porous body the materials undergoing treatment are broken up into such fine state of subdivision and are so uniformly distributed through the molten bath that heating to reaction temperature is immediate and substantially uniform throughout each particle.

The choice of material for the preparation of the molten heat transfer medium employed in the apparatus, of course, to a considerable degree depends upon the character of the reaction which is desired and the material which is to be treated, as well as the final products which are to be obtained. Lead, mercury, glass and such like materials have already been referred to. However, alloys of tin and antimony are also applicable, as well as fused salts and mixtures thereof. Blast furnace slag and such minerals as cryolite are also applicable.

The character of the reaction may be controlled by the temperature and/or the depth of the molten bath, the quantity and velocity of the entering materials and such like factors. The character and rate of the reaction may also be influenced by the addition of various catalytic substances including tellurium, tin-antimony alloys, nickel, nickel oxide, zinc, etc. These substances are catalysts of dehydrogenation. Other catalytic materials include zinc oxide. In some cases the catalyst will float in fused state upon the surface of the molten bath.

The number of reactions to which the apparatus and process constituting the subject matter of this application are applicable is very extensive and include the partial decomposition of hydrocarbon gases (natural and artificial) and other hydrocarbon materials to form olefines such as ethylene, propylene, etc., benzene to diphenyl, etc. Alcohols may be converted into ketones, acids, aldehydes and the like. Ketones, i. e. acetone, may also be converted by pyrolysis to corresponding ketenes. It will thus be appreciated that the term "pyrolysis" as herein employed is of relatively broad scope and includes a vast variety of reactions in which heat treatment is employed.

By conducting the above described reactions in suitable media and under desired temperature and pressure conditions, as well understood in the art, decomposition or condensation reactions may at will be accentuated.

One convenient embodiment of apparatus which may be employed in practicing the invention is disclosed in Figure 1. In this construction a tubular shell 10, of iron, steel, or other suitable material, may be provided with a collar 12 having a flange 14 to which is secured the flange 16 of a lower cap or base plate 18. A seal is provided between flanges 14 and 16 by means of a suitable gasket 20 of graphitized asbestos or other relatively refractory material, which gasket is held under compression by means of bolts 22 extending through the flanges. A feed pipe 24 extends through the cap 18 supplying the material to be pyrolyzed to a porous refractory diaphragm 26, for example a plate composed of alundum, which acts as a distributor for the gas. This diaphragm plate is held in position against an internal flange 30 within the shell 10, which flange may be formed integrally with the shell or may be secured as a separate element in any convenient manner. The diaphragm is made with fine pores which break up and diffuse the material passing therethrough. At the same time, the pores are too fine to permit the bath to seep through against the pressure of the gas. An alundum plate in which the pores occupy approximately 34% to 36% of the volume and the pore diameter is about 0.09 to 0.30 millimeters has been found to be very satisfactory, and will retain molten metals, such as lead, over long periods while permitting comparatively free flow of gases therethrough. A molten bath 32 of lead, mercury, glass or inorganic salt heretofore mentioned, or other suitable non-volatile material, partially fills the shell 10 and is retained within it by means of the porous member. In order to support the member against the hydrostatic pressure exerted by the bath and to overcome the continued vibration of the molten metal as well as to allow for the thermal expansion of the rigid parts, the porous member is held in place at its lower edge by a ring 34 which is supported upon a plurality of spaced, vertical pins 36. These pins are integral with the ring 34 and project downwardly through guide tubes 38 which, like the tube 24, are screwed into the cap 18. The lower ends of the tube are enlarged to form housings 40 for springs 42. The upper ends of the springs engage and support resiliently plate 44 which plate in turn supports the pins 36. The lower ends of springs 42 rest upon screw plugs 46, mounted in housings 40 and constituting means for adjusting the resilient thrust of the springs against the supporting members 44.

The upper extremity of the shell 10 is provided with a collar or sleeve 48 which is threaded and which is closed at its upper end by means of a threaded plug 50. Gaseous material in the space above the molten material may be caused to flow in a sinuous path by means of baffles 51 and is discharged from the shell 10 by means of a conduit 52 threaded into the collar 48 at one end and at the other end threaded into a collector for dust or tar. This collector comprises an outer shell 54 provided internally with a horizontal perforated plate 56 which divides the container into a lower chamber 58 and an upper chamber 60. A layer 62 of filtering material, such as iron screening, asbestos fibers, glass or mineral wool, is deposited on the shelf 56 whereby to catch any lead powder or carbon which may be in suspension in the exit gases from the reaction chamber. It will be observed that the upper portion of the chamber 60 is of slightly conical contour and at its apex discharges into an outlet conduit 64 which leads to any convenient apparatus for storing or further treating gases or vapors after they have passed through the filtering apparatus.

The temperature of the bath is maintained by any suitable, known means. A convenient method of heating the bath is by means of hot flue gases circulating the jacket 15, as illustrated in Figure 1 or by means of electrical heating coils 15, properly insulated as indicated in Figure 2.

In the form of the invention illustrated and described the molten bath may be introduced into the shell 10, for example by removing the plug 50. After introduction of the bath the plug may be reinserted. Escape of the molten bath is prevented by the porous member 26 which is resiliently urged against the flange 30 by means of the springs 42. It will, of course, be appreciated that the pressure exerted by the springs should be sufficient to overcome the hydrostatic pressure exerted by the molten material constituting the bath. By thus resiliently supporting the porous member the contact is insured between the porous member and the flange 30 and at the same time the porous member is free to expand or contract by reason of fluctuation of temperature without any danger of being subjected to crushing forces by reason of the clamping members. In addition, the hammer effect caused by the molten bath is cushioned and the porous diaphragm is thereby effectively protected.

The material to be treated, for example a vaporized or gaseous hydrocarbon material which is to be cracked or polymerized, is introduced into the space below the member 26 through the conduit 24. By application of pressure this gaseous material is caused to flow through the relatively porous member 26 and is discharged in the form of minute bubbles into the molten bath 32. It will be appreciated that the gaseous material is not subjected prematurely to heat prior to contact with the porous member and since the porous member itself is a comparatively poor conductor of heat the gaseous material is not subjected to a temperature sufficient to cause premature decomposition prior to its introduction into the molten bath itself. For this reason there is little or no tendency for the deposition of tar or carbon in the interstices of the porous body. As already stated, the gaseous material is introduced into the molten bath in the form of relatively minute bubbles and these bubbles are distributed over the entire exposed upper surface of the plate or distributor member 26. As a result the distribution of the bubbles through the mass of molten material is comparatively uniform. The fine and uniformly distributed bubbles are almost immediately heated up to reaction temperature, both externally and internally, thereby promoting the reaction in a highly efficient manner.

In event of the apparatus becoming excessively foul after long use or of the plug or plate 26 becoming decomposed or clogged, the apparatus may easily and quickly be taken apart for cleaning merely by removing the bottom member 18 and permitting the plug or plate to drop away from the flange 30. The plates may then be repaired or replaced as may be deemed expedient, with a minimum expenditure of time and effort.

In the form of the invention shown in Figure 2 a shell 70 is provided with a bottom 72 which may be integral therewith. The shell is also provided with a shelf 74, spaced somewhat from the bottom 72 and having an opening 76 formed therein. A porous distributor member 78 of hemispherical, bell or other convenient shape is supported upon the ledge 74 directly above the opening 76 and is held in position by means of a removable, transverse, resilient bar 77. Gaseous material to be subjected to pyrolytic treatment is introduced beneath this distributor member by means of a conduit 80 which, in the form illustrated in the drawing, comprises a lower portion of U-shape projecting downwardly through an opening in the shelf 74 and discharging upwardly under the member 78. In order to insure that the material to be treated is not subjected prematurely to a cracking temperature the conduit 80 preferably is provided with a jacket 82 which is of sufficient diameter to provide an air space 84 between its internal surface and the external surface of the tube 80. This dead air space functions effectively to insulate gases flowing through the tube 80 from the surrounding molten heat transfer medium 86.

The operation of this embodiment of the invention is practically self evident. The shell 70 is merely filled with a suitable heat transfer medium in molten state (for example, molten lead, mercury, glass or molten salts already referred to). The material to be treated, preferably in vapor phase, is then introduced beneath the hemispherical distributor member 78, and by reason of its pressure displaces a portion of the molten material and then permeates into the molten bath through the pores of the distributor member.

It will be appreciated that in either of the forms of the invention shown the period of time of exposure and pressure to which the gaseous material is subjected to heat treatment may be varied at will by increasing or decreasing the depth of the molten bath in the tubular members 10 or 70. Also, the temperatures of the baths may be controlled at will by the application of heat in any conventional manner, or if the reaction is highly exothermic in nature it may be desirable under some circumstances to subject the bath to cooling. The temperatures and times of exposure may approximate those heretofore employed in these operations and, of course, will depend upon the nature of the material being treated. For example, the temperature required for cracking kerosenes and such like will probably be in the neighborhood of 600° C. to 850° C., while for oxidation of alcohol, for example isopropyl alcohol, to form acetone the temperature will be somewhat lower. These temperatures are already well known in the art and discussion thereof is believed to be unnecessary. It will be understood that temperatures and periods of exposure heretofore employed will at least be sufficient to promote effective reaction in applicant's process but not high enough to cause objectionable pyrolysis. However, by reason of the highly efficient distribution of the materials in the molten bath these temperatures and periods of exposure may at times be somewhat reduced below those conventionally employed.

It will be apparent from the foregoing description that the apparatus employed by applicant is relatively simple in character and may be taken down and reassembled for any purposes required with a minimum expenditure of time and effort. The materials to be treated are brought directly into contact with the porous distributor members without being subjected to premature exposure to high temperatures and as a result premature cracking and resultant deposition of carbon or tar in the distributor members is reduced to a minimum or entirely eliminated. The uniform distribution of the material in a high state of subdivision promotes immediate heating of the material to reaction temperatures and tends to prevent the overheating of portions of the material while other portions remain relatively cold. As a result, the yields of the desired product are increased while the formation of undesirable by-products and the escape of unreacted raw material is reduced to a minimum.

To illustrate the difference in action of the process of pyrolysis embodying the principles of the present invention as compared to other methods of pyrolysis, when a hydrocarbon, for example butane, is introduced into a lead bath maintained at a temperature above 750° C., unsaturated hydrocarbon products are formed having the same or fewer carbon atoms per molecule. When the same hydrocarbon is passed through a tube which is heated to 750° C. or less somewhat similar products are formed. However, beyond this temperature the nature of the reaction products changes due, as I believe, to the fundamental difference in the conditions of pyrolysis. These differences indicate secondary reactions, meaning thereby the formation of products having a greater number of carbon atoms and resulting from a combination of the primary cracking products. Thus, for example, one obtains liquid condensates, including benzene, naphthalene, anthracene, etc., in amounts which increase with the temperature up to about 900° C. when the material is passed through a tube type cracker. On the other hand, I have been unable to obtain any liquid condensate or similar secondary reaction products using a lead cracker in which the hydrocarbon is introduced through a porous diaphragm. It is to be observed that the formation of the secondary reaction products is not dependent upon the product charged since it is quite possible to crack a liquid paraffin hydrocarbon stock and obtain thereby aromatics but these aromatics are formed, as I believe, from the low molecular weight unsaturated products and are not formed directly from the high molecular weight aromatic products; in other words, the aromatic results in each case from the simple primary products of pyrolysis whether the charging stock be a gaseous hydrocarbon, such as butane, or a liquid paraffin hydrocarbon. In either case, however, whether the charging stock be butane, propane and the like, or a liquid paraffin hydrocarbon, no secondary products are obtained using the apparatus herein described.

Although I have shown and described only the preferred embodiments of the invention it will be understood that these are merely exemplary and that numerous modifications may be made therein without departure from the spirit of the invention or the scope of the appended claims.

What I claim is:

1. A method of conducting pyrogenetic reactions which comprises forcing a vaporous organic material to be pyrolyzed through a porous refractory body directly into a relatively non-volatile inert bath of molten material heated to the temperature required for the pyrolysis.

2. The method as defined in claim 1 in which the molten bath comprises a fused metal.

3. The method as defined in claim 1 in which the material to be treated is brought into contact directly with the porous distributor member at a temperature below that at which any substantial decomposition occurs.

4. An apparatus for conducting pyrogenetic reactions comprising a container for a molten bath of inert non-volatile heat transfer material, means for externally heating the container and maintaining the bath at reaction temperature, an inlet means adjacent the bottom of the bath, a distributor member disposed cooperatively with respect to the inlet, through which the material to be treated is introduced directly into the bath, the distributor member being composed of a relatively porous refractory material through which the material to be treated permeates.

5. An apparatus as defined in claim 4 in which the distributor member constitutes a part of a wall of the container and serves to confine the molten bath therein.

6. An apparatus as defined in claim 4 in which the distributor member serves to confine the molten bath in the container and is resiliently held in position.

7. An apparatus as defined in claim 4 in which the distributor member is of bell shape and is disposed above the inlet for gaseous material to be treated in such position as to collect the gaseous material.

8. An apparatus as defined in claim 4 in which the distributor member is of bell shape and is disposed about the inlet, said inlet comprising a conduit of U-shape hooked beneath the distributor member and being insulated to prevent premature heating of the material to be treated.

9. An apparatus for conducting pyrogenetic reactions comprising a shell for containing a molten inert heat transfer medium, said shell having an internal flange formed therein, a permeable distributor member disposed against the flange and contacting with the bath, resilient means urging the distributor member against the flange and means for supplying vaporous material to the distributor member under sufficient pressure to force the vaporous material through the distributor member.

10. A method of conducting pyrogenetic reactions upon organic vaporous materials which, under the conditions of reaction, tend to decompose to form tarry masses, which comprises forcing the material while in vapor phase and below the reaction temperature through a refractory, porous, non-perforate member directly into a non-volatile, inert bath heated to the temperature of reaction.

11. A method of pyrolyzing hydrocarbons which comprises forcing them in vapor form through a porous, non-perforate body directly into a bath of inert, molten, non-volatile, non-decomposable material heated to the temperature of reaction.

12. A method of oxidizing organic materials which comprises forcing them in vapor form, together with oxygen, through a porous, non-perforate plate into a non-volatile, non-decomposable molten bath heated to the desired temperature of reaction.

13. A method of cracking higher saturated hydrocarbons to form gasoline which comprises forcing the hydrocarbons, in gaseous phase, through a porous, non-perforate body of refractory material directly into an inert, molten, non-volatile, non-decomposable bath heated to cracking temperature.

CHARLES A. THOMAS.